Jan. 5, 1954

W. A. WISEMAN 2,664,870

ENGINE CONTROL SYSTEM

Filed Sept. 1, 1951

INVENTOR.
WILLIAM A. WISEMAN
BY
Hauke & Hardesty
ATTORNEYS

Jan. 5, 1954  W. A. WISEMAN  2,664,870
ENGINE CONTROL SYSTEM

Filed Sept. 1, 1951  5 Sheets-Sheet 3

INVENTOR.
WILLIAM A. WISEMAN
BY
Hauke & Hardesty
ATTORNEYS

Jan. 5, 1954 W. A. WISEMAN 2,664,870
ENGINE CONTROL SYSTEM
Filed Sept. 1, 1951 5 Sheets-Sheet 4

INVENTOR.
WILLIAM A. WISEMAN
BY
*Hanke & Hardesty*
ATTORNEYS

Jan. 5, 1954
W. A. WISEMAN
2,664,870
ENGINE CONTROL SYSTEM
Filed Sept. 1, 1951
5 Sheets-Sheet 5
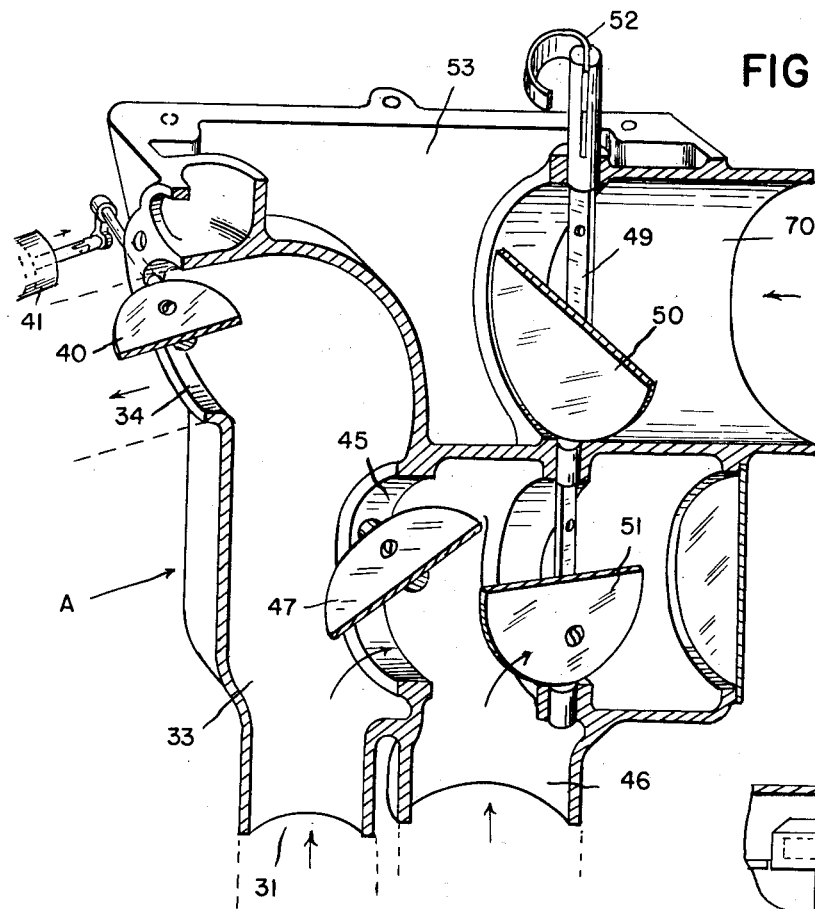
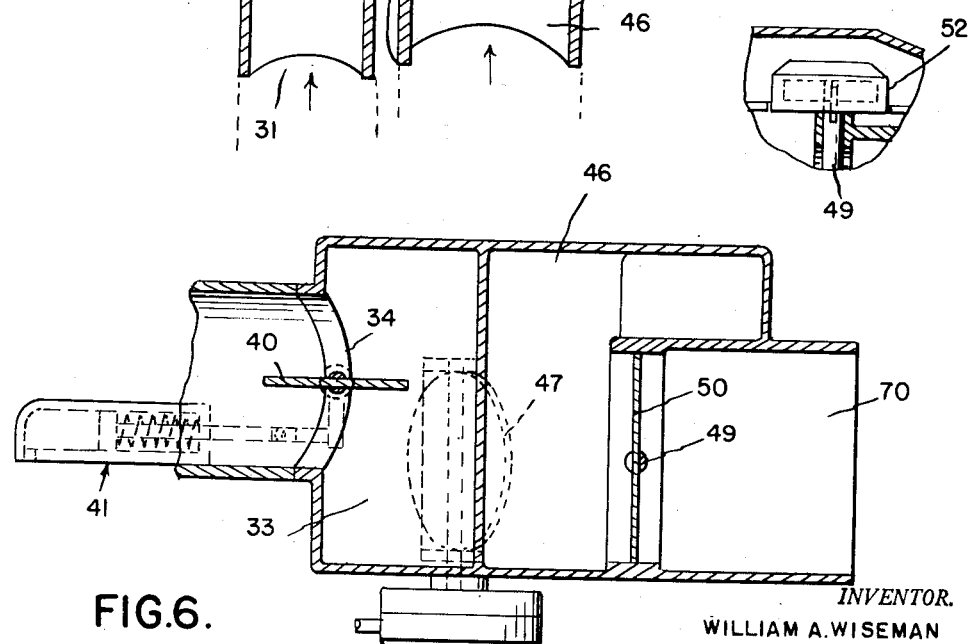
INVENTOR.
WILLIAM A. WISEMAN
BY
*Henkel & Hardesty*
ATTORNEYS Patented Jan. 5, 1954

2,664,870

UNITED STATES PATENT OFFICE 2,664,870

ENGINE CONTROL SYSTEM

William A. Wiseman, Muskegon, Mich., assignor to Continental Motors Corporation, Muskegon, Mich., a corporation of Virginia Application September 1, 1951, Serial No. 244,803

9 Claims. (Cl. 123—122)

My invention relates to an engine control system and more particularly to an assembly of various auxiliaries operable to automatically facilitate the starting of a multi-cylinder internal combustion engine under adverse low temperature conditions.

Power plants of the type are employed quite generally in starting jet engines, in operating fuel and and oil pumps and air compressors, and are particularly employed by the army and navy at various air bases. The air bases are sometimes situated in extreme cold climates and it is quite difficult to operate these power plants under such cold climatic conditions, it being particularly difficult to start these engines.

It is an object of my present invention to overcome these difficulties by providing a unitary assembly of various auxiliaries automatically operable under various climatic conditions to insure positive operation of the power plant.

For a more detailed understanding of my invention reference may be had to the accompanying drawings illustrating a preferred embodiment of my invention in which like parts are identified by like reference characters throughout the several views and in which Fig. 1 is a plan view of a power plant equipped with the control auxiliaries of my invention.

Fig. 5 is a sectional perspective view of the air distributing device of my invention.

Fig. 6 is a horizontal detailed sectional view thereof taken substantially on the line 6—6 of Fig. 3, and Fig. 7 is a fragmentary sectional view of one of the thermal control devices.

Figure 1:
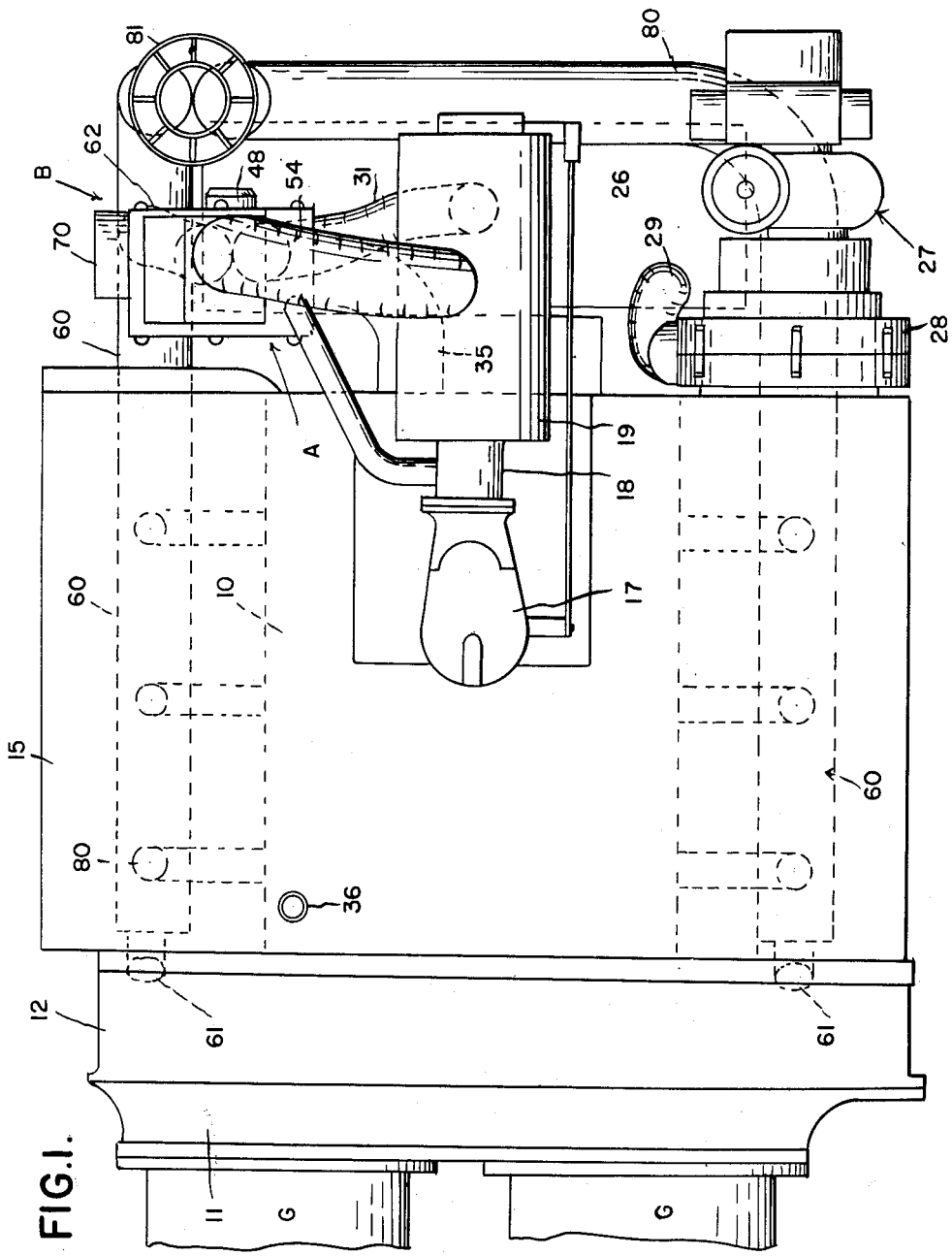

I have chosen for purposes of illustration to show my invention in connection with a multicylinder engine 10 of the type having opposed air cooled cylinders, but it will be quite obvious that the engine control system designated as a whole by reference character "B" may be satisfactorily employed as well with other types of air or liquid cooled engines.

Figure 2:
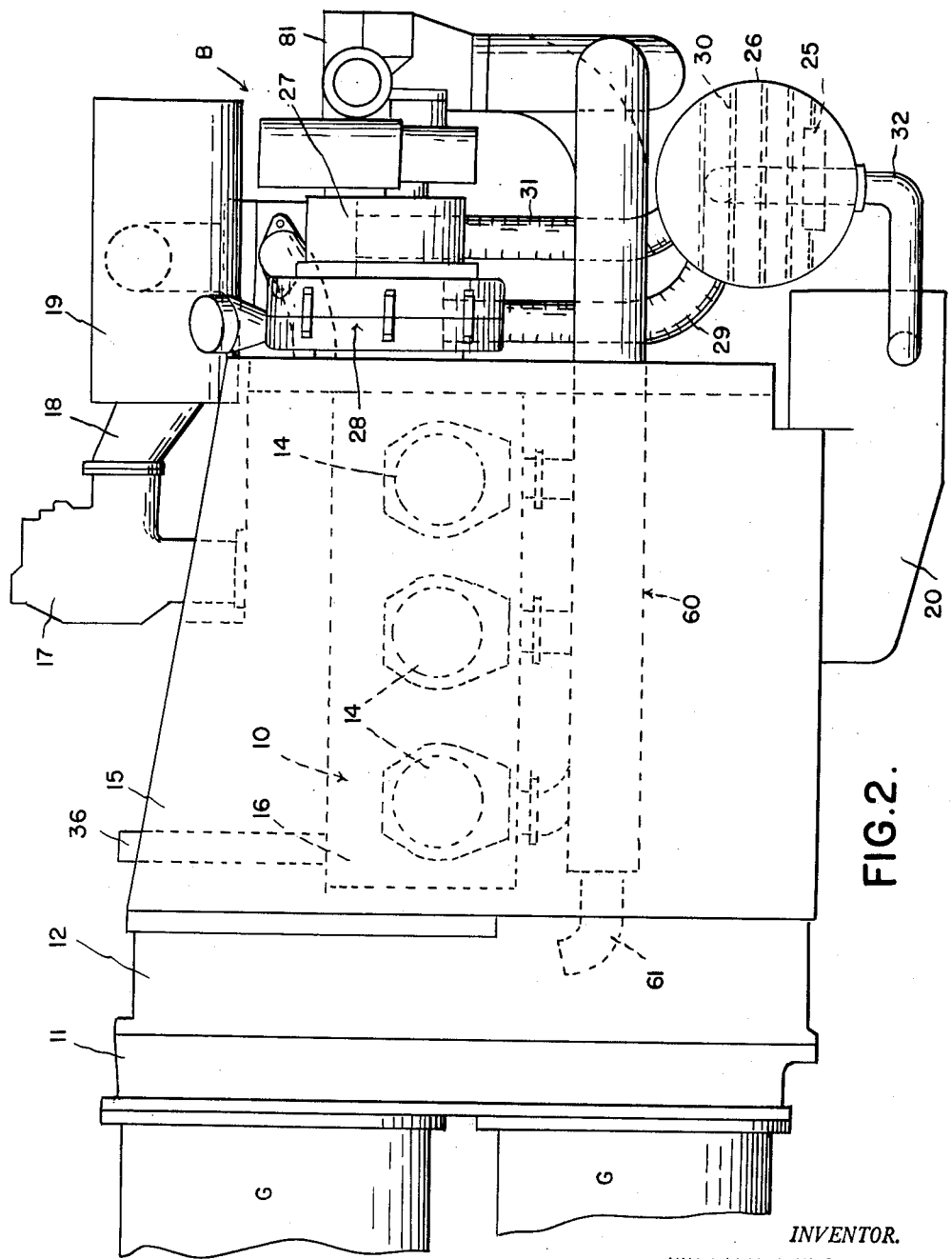
Fig. 2 is a side view thereof.

As stated, these power plants are employed to drive compressors, pumps or other machinery, and Fig. 2 illustrates same as driving generators "G." The power take off comprises a gearing assembly housed within a gear case 11 and a main blower is housed within the casing 12 to circulate cooling air over the engine cylinders 14. Preferably a shroud 15 encloses the engine 10, and the engine crankcase 16 extends longitudinally in this shroud. A carburetor 17 is mounted on the engine, the carburetor receiving air through the air induction pipe 18 which air has been passed through a conventional air filter 19.

When using such engines in cold climates, it will be understood that the engine becomes quite cold when idle for some time, and the oil in said engine is congealed and very thick under such conditions and very difficult to start the engine, and conventional starters are inadequate to turn over the engine when seeking to start same.

Figure 3:
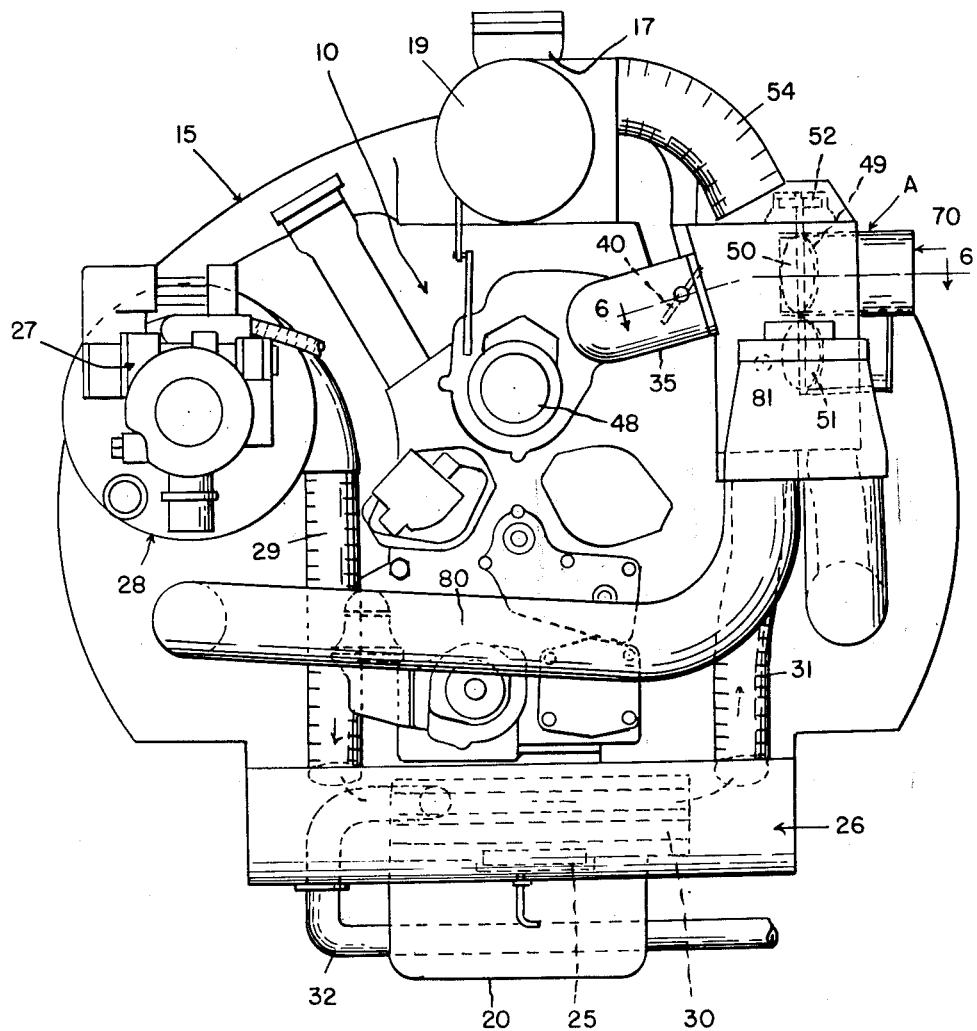
Fig. 3 is an end view thereof.
Figure 4:
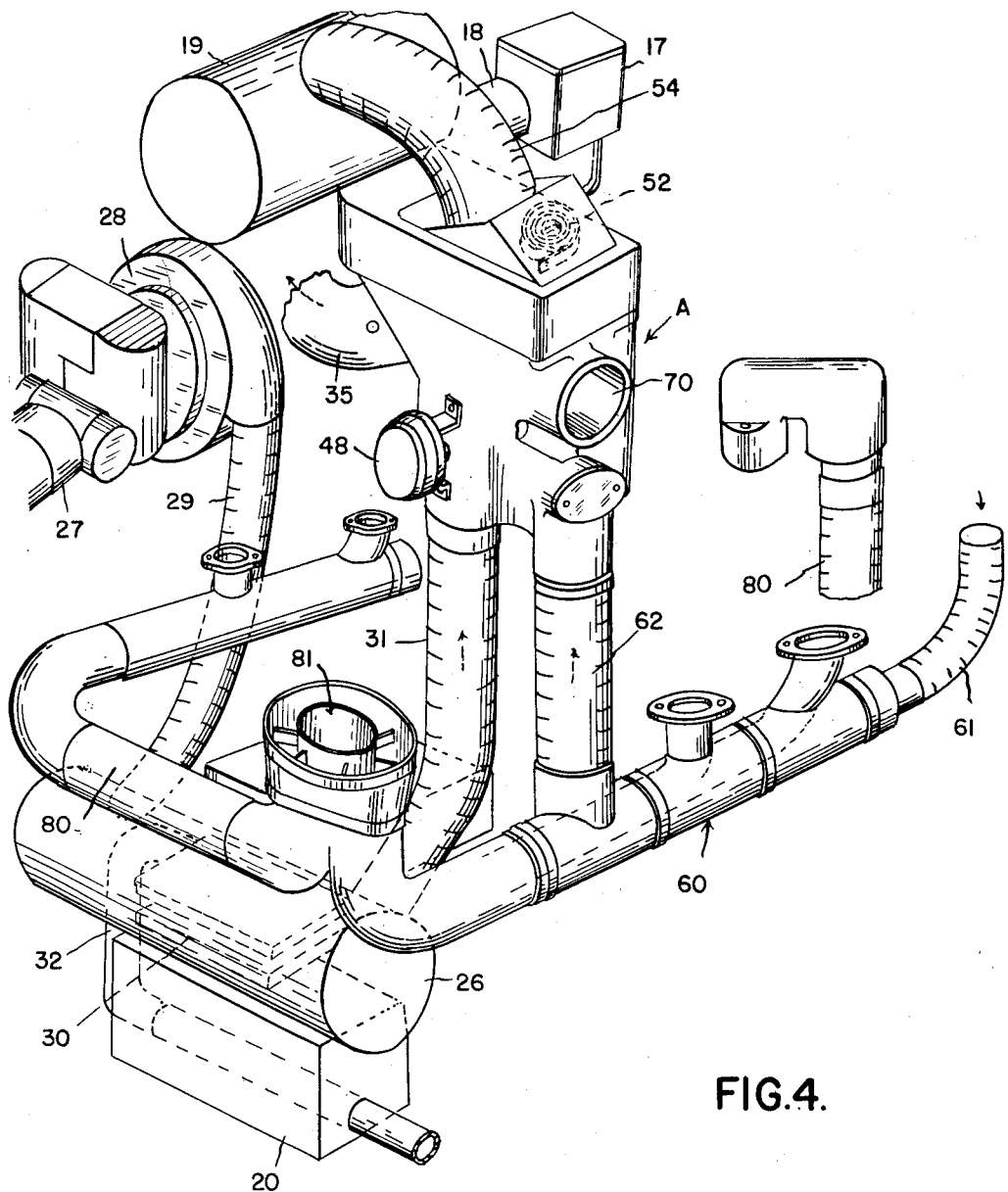
Fig. 4 is a fragmentary diagrammatic perspective view of the auxiliary assembly.

I have therefore devised an assembly of various auxiliaries which can be made operative to facilitate the starting and operation of the power plant under these adverse climatic conditions. These auxiliaries are assembled and mounted on suitable supports at the rear of the engine, as will be plainly evident from Figs. 1 to 3 inclusive. To understand the invention, we shall assume that the engine is to be placed into operation under an extremely cold climatic condition, the engine 10 is stiff as is the oil in the engine sump 20 and on the surfaces of the various moving parts of said engine. The air available for the carburetor is also cold and thus it is extremely difficult to obtain proper vaporization of the fuel. Operation under warm climatic conditions will be explained later.

The first step in getting this power plant ready for operation under such adverse cold climatic conditions is to light the burner 25 in the air heater 26 and to start the small engine 27. This engine drives a blower 28 which blows air through duct 29 into the air heater 26, where said air is passed in heat transfer relation with a heat exchange unit 30 and thence through duct 31 to the air distributor device "A." The exhaust gases from the air heater 26 are passed through the exhaust pipe 32 which preferably extends through the oil sump 20 of the engine for the purpose of heating the oil in the engine oil sump.

The heated air from the air heater 26 is forced into passage 33 in the air distributing device "A," and thence out the port 34 into the duct 35 into the rear end of the engine crankcase 16, the heated air then passing longitudinally through the crankcase and out through the discharge outlet or stack 36. The flow of heated air through the crankcase thoroughly warms the engine proper and all lubricated surfaces, bearings and the like. The exhaust gases from the air heater warm the oil in the engine sump. A valve 40 is spring biased to the open position (see Fig. 5) and device 41 actuated in response to engine oil pressure is provided for closing valve 40 after the engine 10 is started.

A port 45 connects passage 33 with passage 46 and a valve 47 is provided for controlling flow of air through port 45. A thermostat 48 is made responsive to engine oil temperature and when the oil temperatures reach a predetermined temperature of about 60° F., the thermostat 48 is actuated to open the port 45 by moving valve 47 to open position. The remaining two valves shown in Fig. 5 are mounted on a valve shaft 49, a valve 50 for the cold air inlet and the valve 51 for the hot air from passage 31. A thermostat 52 is responsive to the air temperature in chamber 53 and is operated to adjust valves 50 and 51. If the temperature in chamber 53 gets too hot valve 50 is opened to let in cold air from intake 70 and valve 51 is moved towards the closed position to cut down the supply of hot air. The thermostat 52 is set to provide for an air temperature in chamber 53 which is proper for the carburetor. The warm air from chamber 53 is conducted through the duct 54 to a conventional air filter 19 and thence through duct or passage 18 to the engine carburetor 17.

The engine is now ready to be started and it is started in the customary manner, it being preferably provided with an electric starter or other suitable starting means. After the engine is started, the engine oil pressure immediately builds up so that the valve 40 is closed. We continue to use the heated air from passage 33 for the carburetor for a time, or until the engine exhaust heater is operable to sufficiently heat enough air for the carburetor requirements. Cold air from the forward part of the engine within the shroud 15 is fed into the cold air intake 61 and thence into the exhaust heater 60, and subsequently discharged through the duct or pipe 62 and into passage 46 of the air distributing device "A," and made available for carburetor use. When this air from the engine exhaust heater reaches the proper temperature for mixing with the fuel in the carburetor, the air heater 26 may be turned off and engine 27 and blower driven thereby shut down. Engine exhaust pipes 80 conduct said engine exhaust to the exhaust heater 60 and thence to the main engine exhaust 81.

It will be obvious that when starting the engine under warm climatic conditions where air temperatures are satisfactory for carburetor use, it is unnecessary to use the assembly 27—28. Under such conditions, valve 47 is open because the oil temperature is up. The air heater 26 is of course always preferably used whenever the air temperature for the carburetor is below the temperature required.

I claim:

1. A power plant assembly comprising a multi-cylinder engine having a crankcase, an oil sump structure carried by said crankcase, a carburetor for said engine and exhaust manifold means for said engine, an air heater embodied in said power plant assembly and having a heat exchange unit, an auxiliary engine and blower driven thereby for circulating air to be heated to the heat exchange unit of said air heater, an exhaust gas air heater constructed to heat a supply of air conducted in heat exchange relation to said exhaust manifold means, an air distributing means associated therewith and having interconnected air ducts and outlet and inlet ports, one of said outlet ports connected with the carburetor air inlet and another outlet port connected with the crankcase interior, one of said inlet ports connected with hot air outlet of the air heater and another of said inlet ports connected with the hot air outlet of the exhaust gas air heater, thermal responsive means for controlling the flow of air through said air distributing means, said assembly constructed and arranged for operation to initially conduct the air heated by said air heater to the crankcase, means simultaneously conducting the exhaust gas from said air heater to the oil sump of said crankcase to heat the oil therein, said thermal means operable when the oil temperature reaches a predetermined degree to open said hot air conducting means to the carburetor, and second valve means operable in response to engine oil pressure upon starting of said engine in operation to close off the hot air supply to said engine crankcase.

2. A system for starting a multi-cylinder internal combustion engine under adverse low temperature conditions, said engine having a carburetor, an engine exhaust means and a crankcase provided with an oil sump, said system comprising a blower and a small horsepower engine for driving said blower, an air heater having a heat exchange unit, said blower circulating air through the aforesaid heat exchange unit, said system having an air distributing means, means conducting said heated air to said air distributing means, means conducting the hot exhaust gases from the air heater and passing the gases through the oil sump of said engine, said air distributing means having interconnected air passages and valves, connections conducting heated air from said air distributing means to the carburetor of said engine and other means conducting heated air from said air distributing means to the engine crankcase and circulating the heated air in the crankcase to warm the engine, one of said thermal responsive means operable in response to a predetermined rise in the temperature of the oil in said engine sump to open certain of said valves whereby to make said heated air available for supplying the carburetor, and means operable in response to engine oil pressure developed on starting said internal combustion engine to close the valve controlling the supply of heated air to the engine crankcase, a heat exchange device associated with the engine exhaust and means conducting heated air from said last mentioned heat exchange device to the air distributing means and available for conduction to the engine carburetor.

3. In a system for automatically controlling the operation of a multi-cylinder internal combustion engine under adverse low temperature conditions, said engine having a carburetor and a crankcase provided with an oil sump, an assembly consisting of an auxiliary air heater, a blower and an auxiliary engine for driving said blower, said system comprising ducts conducting heated air from the air heater to the engine crankcase prior to starting said engine and subsequently to the engine carburetor and the exhaust gases from said air heater to the engine oil sump, valve means actuated in response to engine oil pressure to shut off flow of heated air to the engine crankcase, and thermally actuated valve means operated in response to a predetermined rise in temperature of the oil in engine sump to open and make available the supply of heated air to the carburetor.

4. In a system for controlling the operation of a multi-cylinder internal combustion engine under adverse low temperature conditions, said engine having a carburetor and a crankcase provided with an oil sump, an assembly consisting of an auxiliary air heater, a blower and an auxiliary engine for driving said blower, said system comprising ducts conducting heated air from the air heater to the engine crankcase prior to starting said engine and subsequently to the engine carburetor and the exhaust gases from said air heater to the engine oil sump, valve means actuated in response to engine oil pressure to shut off flow of heated air to the engine crankcase, and valve means operated in response to a predetermined rise in temperature of the oil in engine sump to open and make available the supply of heated air to the carburetor, said assembly mounted on one end of said engine, said duct leading heated air to the engine crankcase comprising a connection discharging said heated air into one end of the crankcase, said crankcase having an air outlet adjacent the other end of the crankcase.

5. In a system for controlling the operation of a multi-cylinder internal combustion engine under adverse low temperature conditions, said engine having a carburetor and a crankcase provided with an oil sump, an assembly consisting of an auxiliary air heater, a blower and an auxiliary engine for driving said blower, said system comprising ducts conducting heated air from the air heater to the engine crankcase prior to starting said engine and subsequently to the engine carburetor and the exhaust gases from said air heater to the engine oil sump, valve means actuated in response to engine oil pressure to shut off flow of heated air to the engine crankcase, and valve means operated in response to a predetermined rise in temperature of the oil in engine sump to open and make available the supply of heated air to the carburetor, said assembly mounted on one end of said engine, said duct leading heated air to the engine crankcase comprising a connection discharging said heated air into one end of the crankcase, said crankcase having an air outlet adjacent the other end of the crankcase, said assembly further including a unitary air distributing device having interconnected air passages and means for supporting the aforesaid valve means, and thermal control devices mounted on said device to operate said valves.

6. In a system for controlling the operation of a multi-cylinder internal combustion engine having a carburetor and a crankcase provided with an oil sump, an air distributing device having a pair of interconnected air passages terminating in separate outlets, means connecting one of said outlets with the engine crankcase and said second outlet with the engine carburetor, a source of heated air supplied to said device under forced draft, other means for directly heating the oil in the engine oil sump, a thermally actuated valve between said pair of air passages and operable to open in response to a predetermined rise in temperature of the oil to place the second outlet in communication with the supply of heated air and thus available for said engine carburetor for starting the engine, and a second valve at said first outlet and operated in response to engine oil pressure produced after starting the engine to shut off the supply of heated air to the engine crankcase.

7. In a system for controlling the operation of a multi-cylinder internal combustion engine having a carburetor and a crankcase provided with an oil sump, an air distributing device having a pair of interconnected air passages terminating in separate outlets, means connecting one of said outlets with the engine crankcase and said second outlet with the engine carburetor, a source of heated air supplied to said device under forced draft, other means for directly heating the oil in the engine oil sump, a thermally actuated valve between said pair of air passages and operable to open in response to a predetermined rise in temperature of the oil to place the second outlet in communication with the supply of heated air and thus available for said engine carburetor for starting the engine, and a second valve at said first outlet and operated in response to engine oil pressure produced after starting the engine to shut off the supply of heated air to the engine crankcase, said second valve being spring biased to open position, whereby to open said valve on stopping the engine.

8. In a system for controlling the operation of a mutli-cylinder internal combustion engine having a carburetor and a crankcase provided with an oil sump, an air distributing device having a pair of interconnected air passages terminating in separate outlets, means connecting one of said outlets with the engine crankcase and said second outlet with the engine carburetor, a source of heated air supplied to said device under forced draft, other means for directly heating the oil in the engine oil sump, a thermally actuated valve between said pair of air passages and operable to open in response to a predetermined rise in temperature of the oil to place the second outlet in communication with the supply of heated air and thus available for said engine carburetor for starting the engine, and a second valve at said first outlet and operated in response to engine oil pressure produced after starting the engine to shut off the supply of heated air to the engine crankcase, said second valve being spring biased to open position, whereby to open said valve on stopping the engine, said source of heated air comprising an air heater having a heat exchange unit and a blower powered by an auxiliary engine operable to circulate air through the heat exchange unit and to said device, and means conducting the exhaust from said air heater through the engine oil sump to directly heat the oil therein.

9. In a system for controlling the operation of a multi-cylinder internal combustion engine having a carburetor and a crankcase provided with an oil sump, an air distributing device having a pair of interconnected air passages terminating in separate outlets, means connecting one of said outlets with the engine crankcase and said second outlet with the engine carburetor, a source of heated air supplied to said device under forced draft, other means for directly heating the oil in the engine oil sump, a thermally actuated valve between said pair of air passages and operable to open in response to a predetermined rise in temperature of the oil to place the second outlet in communication with the supply of heated air and thus available for said engine carburetor for starting the engine, and a second valve at said first outlet and operated in response to engine oil pressure produced after starting the engine to shut off the supply of heated air to the engine crankcase, said second valve being spring biased to open position, whereby to open said valve on stopping the engine, said source of heated air comprising an air heater having a heat exchange unit and a blower powered by an auxiliary engine operable to circulate air through the heat exchange unit and to said device, and means conducting the exhaust from said air heater through the engine oil sump to directly heat the oil therein, an exhaust heater associated with the engine and operable to supply heated air to said second passage and to the engine carburetor during engine operation, a cold air inlet into said second air passage leading to the second outlet and to the carburetor, third and fourth valves respectively mounted in said second passage to control flow of heated air therethrough and in said cold air inlet, and means responsive to thermal conditions of the air in said second passage as it is fed to the carburetor to adjust said third and fourth valves, whereby to maintain substantially uniform temperature of the air being supplied to the carburetor.

WILLIAM A. WISEMAN.

References Cited in the file of this patent

UNITED STATES PATENTS

| Number | Name | Date |
|---|---|---|
| 1,460,668 | Good | July 3, 1923 |
| 1,927,554 | McCleery | Sept. 19, 1933 |
| 1,992,568 | Connor | Feb. 26, 1935 |
| 2,405,144 | Holthouse | Aug. 6, 1946 |

FOREIGN PATENTS

| Number | Country | Date |
|---|---|---|
| 864,250 | France | Jan. 13, 1941 |